United States Patent [19]

Vassar

[11] 4,128,144
[45] Dec. 5, 1978

[54] BRAKE AND WHEEL LOCK

[76] Inventor: Hervey P. Vassar, Nicol Terrace, Rumson, N.J. 07760

[21] Appl. No.: 858,850

[22] Filed: Dec. 8, 1977

[51] Int. Cl.$^2$ .......................... B60B 33/00; B60T 1/04
[52] U.S. Cl. .................................... 188/1 D; 16/35 R; 188/29; 188/80; 188/166
[58] Field of Search .................... 188/1 D, 19, 21, 22, 188/25, 29, 37, 57, 80, 136, 166, 167, 342; 280/33.99 C; 16/35 R

[56] References Cited

U.S. PATENT DOCUMENTS

| | | | |
|---|---|---|---|
| 1,190,073 | 7/1916 | Allison | 188/37 |
| 3,283,851 | 11/1966 | Smith | 188/136 |
| 4,018,449 | 4/1977 | Anderson | 188/29 |

FOREIGN PATENT DOCUMENTS

| | | | |
|---|---|---|---|
| 93363 | 10/1910 | Fed. Rep. of Germany | 188/80 |
| 1332044 | 10/1973 | United Kingdom | 188/80 |
| 1467139 | 3/1977 | United Kingdom | 188/80 |

Primary Examiner—Edward R. Kazenske
Attorney, Agent, or Firm—Richard L. Miller

[57] ABSTRACT

A brake for locking a dolly caster wheel against rotation in either direction; the brake including a pair of parallel, spaced apart jam rollers each of which is carried on a frame, the frame being movable by means of a single push button so to move both rollers selectively in or out of a position wherein the rollers are jammed or wedged between the wheel periphery and a stationary bracket that forms a rigid part of the caster assembly.

1 Claim, 4 Drawing Figures

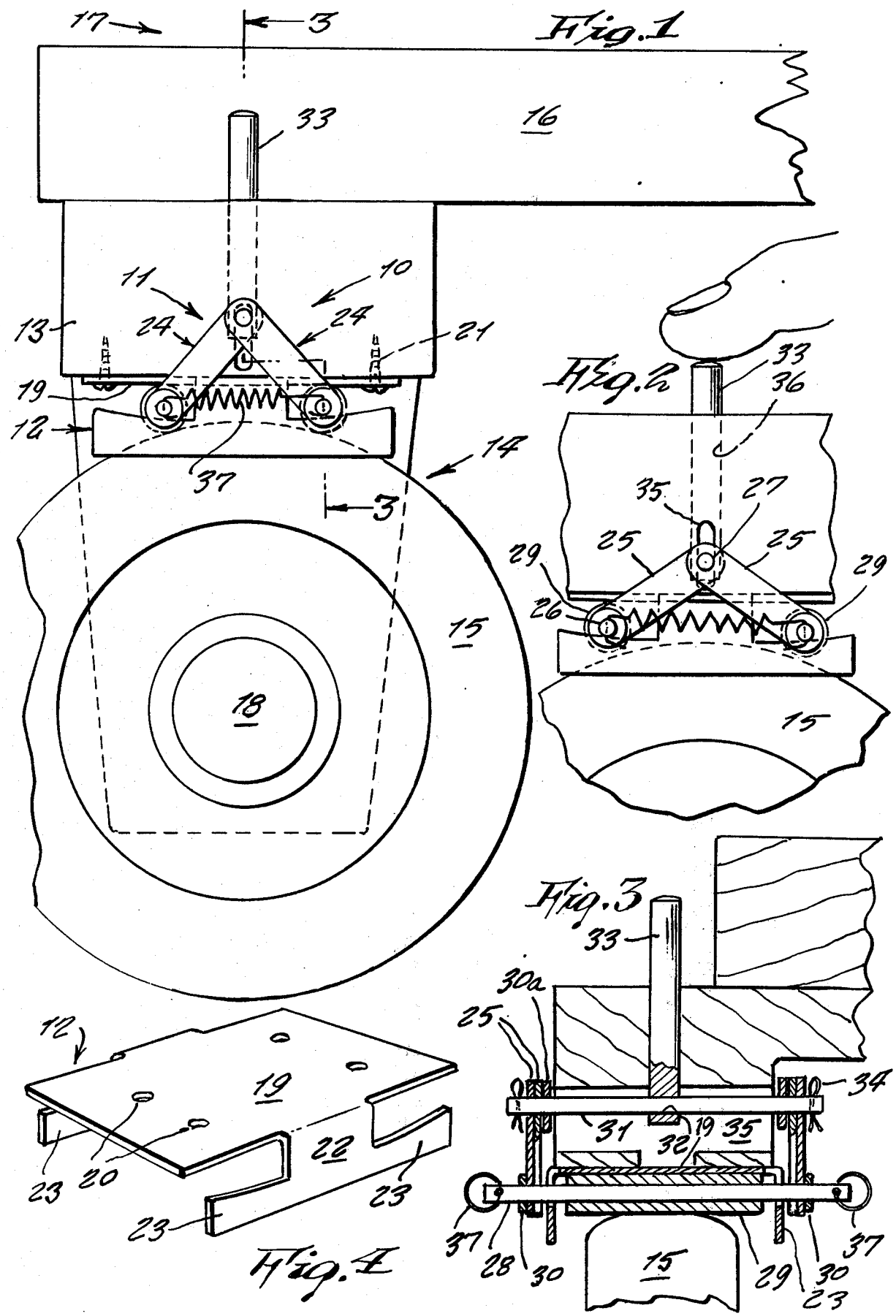

BRAKE AND WHEEL LOCK

This invention relates generally to brakes for caster wheels such as are used on dollies.

Caster mounted dollies are used generally throughout industry and the military for transferring heavy or bulky loads from one place to another. In many cases they are equipped with some type of brake or wheel locking device to prevent movement of the dolly during certain operating procedures or for stopping in transit. Special dollies designed to handle ordnance materials for the military require "fail safe" or "dead man" type brake systems which mean the wheels are normally locked and released only when movement is required. Most systems of this type require four wheel actuation from a single brake handle which must be held continuously during the operating period. The force necessary to do this must be applied manually which can be both awkward and tiring for the operator.

There are two major kinds of brake mechanisms used for the purpose of stopping or holding dollies under the conditions previously described. These are mechanical interference or positive lock types and shoe or disc type friction brakes. The mechanical interference types usually consist of pawls, cams, pins, or other latching devices which are attached to the caster yoke and brought into contact with detents or projections on the wheel hub thereby locking the wheel. They have the advantage of compact design with small actuating force for maximum holding power. Depending upon the number of stop positions in the wheel hub some motion of each wheel is always possible. Because of this, brakes do not lock simultaneously causing excessive wheel wear, difficult to position dolly accurately some fore and aft movement in locked position, and under load latches may be hard to release as one of them is usually doing all the work. These disadvantages are particularly troublesome aboard ships at sea as the dolly will pick up the ships motion.

Friction brakes have the advantage of acting on all four wheels at once preventing any dolly movement when applied and permitting accurate positioning. However, they are not commonly used in manual "fail safe" type brake systems as heavy springs are necessary to maintain sufficient friction shoe pressure to prevent slippage under load. Manual release of such brakes requires overcoming the heavy spring pressures through mechanical advantage and even with the use of special hydraulic devices this becomes both difficult and expensive. The small clearance between brake shoe and wheel surface is a source of trouble due to the accumulation of dirt and grit which can jam the wheel.

Accordingly, it is a principal object of the present invention to provide a dolly caster wheel brake and lock which has the advantages over both the mechanical interference and friction type brakes described above, and which gives a positive wheel locking in either forwardly or rearwardly direction.

Another object is to provide a brake and wheel lock having a low actuating force and a low release force for operation thereof.

Yet a further object is to provide a brake and wheel lock which permits either two or four wheel simultaneous brake activation, or individual wheel locking, and which can be used also as a parking lock on automotive type brake drums, a crane wheel lock, a crane hoist drum lock, a rotating shaft lock, or the like.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a side view of the invention shown with wheel being braked.

FIG. 2 is a similar view showing the wheel released.

FIG. 3 is a cross-section on line 3—3 of FIG. 1.

FIG. 4 is a perspective view of the track plate.

Referring now to the drawing in detail, the reference number 10 represents a brake and wheel lock according to the present invention wherein the same includes a movable mechanism 11 and a stationary bracket 12, both of which are installed on a yoke 13 of a caster assembly 14 which includes a wheel 15. The yoke may or may not be made to swivel respective to a pallet 16 of a dolly 17, thus formed. The yoke is inverted U-shaped so to support shaft 18 around which the wheel rotates.

In the present invention, the bracket 12, formed from a single steel plate includes a flat, horizontal jam plate 19 having mounting holes 20 for securement thereof by screws 21 to an underside of a bridge portion of the yoke above the wheel. A pair of downwardly bent tongues 22 on opposite sides of the jam plate each includes opposite extending ends which serve as track rails 23, the upper edges of which are upwardly curved toward an outer terminal end thereof.

The movable mechanism includes a pair of frames 24 each of which includes a pair of, spaced apart links 25 stamped from a flat steel stock having an opening 26 and 27 near opposite ends. A steel pin 28 fitted at its center with a cylindrical jam roller 29 is fitted at opposite ends through the openings 26 and is thereafter fitted with a washer 30. A single second steel pin 31 is then fitted at the center through a transverse hole 32 of a pushbutton pin 33. The opposite ends of the second pin 31 are then fitted through washers 30a and through both openings 27 of both frames 24. A cotter pin 34 transversely through the ends of the second pin secures the assembly together.

The second pin extends through a slot 35 formed through the yoke, while the push button pin is slidable in an opening 36 that communicates with the slot so that when the pushbutton pin slides vertically, then the second pin 31 likewise is slidable in the slot.

The first steel pin 28 is positioned to slide upon the rails 23, and the jam roller is positioned between the rails, as shown. A tension spring 37 is secured between the opposite ends of the first pins 28 so as to pull the lower ends of the frames together.

In operative use, it is now evident that when the pushbutton pin is not urged downwardly, then the springs cause the rollers to be pulled toward each other so that each roller becomes jammed or wedged between a periphery of the wheel and the underside of the jam plate, as is clearly shown in FIG. 1, so that the wheel is thus locked from rotating.

When the pushbutton pin is depressed, as shown in FIG. 2, this causes the frame lower ends to spread apart, against the action of the springs so that the rollers are thus pulled out of their jamming or wedging position between the wheel periphery and the jam plate, so that the wheel is thus free to rotate.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A brake and wheel lock for a caster assembly of a dolly, said caster assembly comprising an inverted, U-shaped yoke and a wheel rotatable on an axle supported at opposite ends thereof in said yoke beneath the center of said yoke; said brake and wheel lock including a movable mechanism and a stationary bracket; said stationary bracket comprising a flat jaw plate mounted on an underside of said yoke and a pair of integral downwardly extending tongues on opposite sides of said jaw plate, each of said tongues forming a rail means; said movable mechanism comprising a pair of parallel, spaced apart rollers, each having a pin extending therethrough, each said pin extending from said rail means on one side of said jaw plate to said rail means on the other side of said jaw plate and being slidable thereon, a pair of U-shaped frame means positioned angularly with respect to each other so as to converge together at their terminal ends, the terminal ends of each said frame means being pivotally mounted on a single slide pin and each said frame means including one of said rollers and said respective pin with opposite ends of said respective pin being pivoted in one end of a pair of parallel links, the opposite ends of said pair of links of each said frame means, forming said terminal ends, being pivoted on said slide pin, said slide pin being affixed to a lower end of a pushbutton pin slidable in a vertical hole in said yoke, said vertical hole communicating with a horizontal slot transversely through said yoke and in which said slide pin is vertically slidable, spring means secured at opposite ends thereof to the pin on each said respective roller for urging the rollers in a direction toward each other into a wedged position between the periphery of said wheel and the underside of said jaw plate for braking and locking said wheel against rotation, and a vertical downward movement of said pushbutton being transmitted through said slide pin and said links to said rollers to urge said rollers in a direction away from each other along said rail means and thereby away from the periphery of said wheel to allow rotation of said wheel.

* * * * *